(12) United States Patent
Griffin

(10) Patent No.: US 6,282,349 B1
(45) Date of Patent: Aug. 28, 2001

(54) LAUNCH FIBER TERMINATION

(76) Inventor: Stephen Griffin, 3437 E. Melody Dr., Phoenix, AZ (US) 85040

( * ) Notice: Subject to any disclaimer, the term of this patent is extended or adjusted under 35 U.S.C. 154(b) by 0 days.

(21) Appl. No.: 09/506,171

(22) Filed: Feb. 17, 2000

(51) Int. Cl.⁷ ................. G02B 6/00; G02B 6/36
(52) U.S. Cl. .................................................. 385/81
(58) Field of Search .................... 385/80–89, 147

(56) References Cited

U.S. PATENT DOCUMENTS

| | | | | |
|---|---|---|---|---|
| 3,853,526 | * | 12/1974 | Hochart | 65/253 |
| 4,183,619 | * | 1/1980 | Makuch | 385/82 |
| 4,312,571 | * | 1/1982 | Ganzhorn | 134/2 |
| 5,291,570 | * | 3/1994 | Filgas et al. | 385/78 |
| 5,574,820 | * | 11/1996 | Griscom | 385/142 |
| 5,598,496 | * | 1/1997 | Anderson et al. | 385/84 |
| 5,886,265 | * | 3/1999 | Chatrefou | 73/651 |

* cited by examiner

*Primary Examiner*—Akm E. Ullah
(74) *Attorney, Agent, or Firm*—The Halvorson Law Firm

(57) ABSTRACT

A high energy surgical launch fiber termination includes a cylindrical quartz ferrule having a bore through it of a first predetermined diameter. An optical fiber, which has at least a silica core and a polymer external jacket, is attached to the quartz ferrule by stripping the external jacket from a length of the end of the optical fiber to expose a portion of the silica core. This inner core is inserted into the bore in the quartz ferrule, and is fused to the ferrule by means of heat fusion, without employing any adhesives, to bond the ferrule and the optical fiber together. A metal beam block surrounds at least a portion of the quartz ferrule on the side where the optical fiber is inserted into it. The beam block includes an extension surrounding the polymer external jacket of the fiber; and the extension is crimped onto the polymer jacket to hold the beam block and fiber in place.

20 Claims, 3 Drawing Sheets

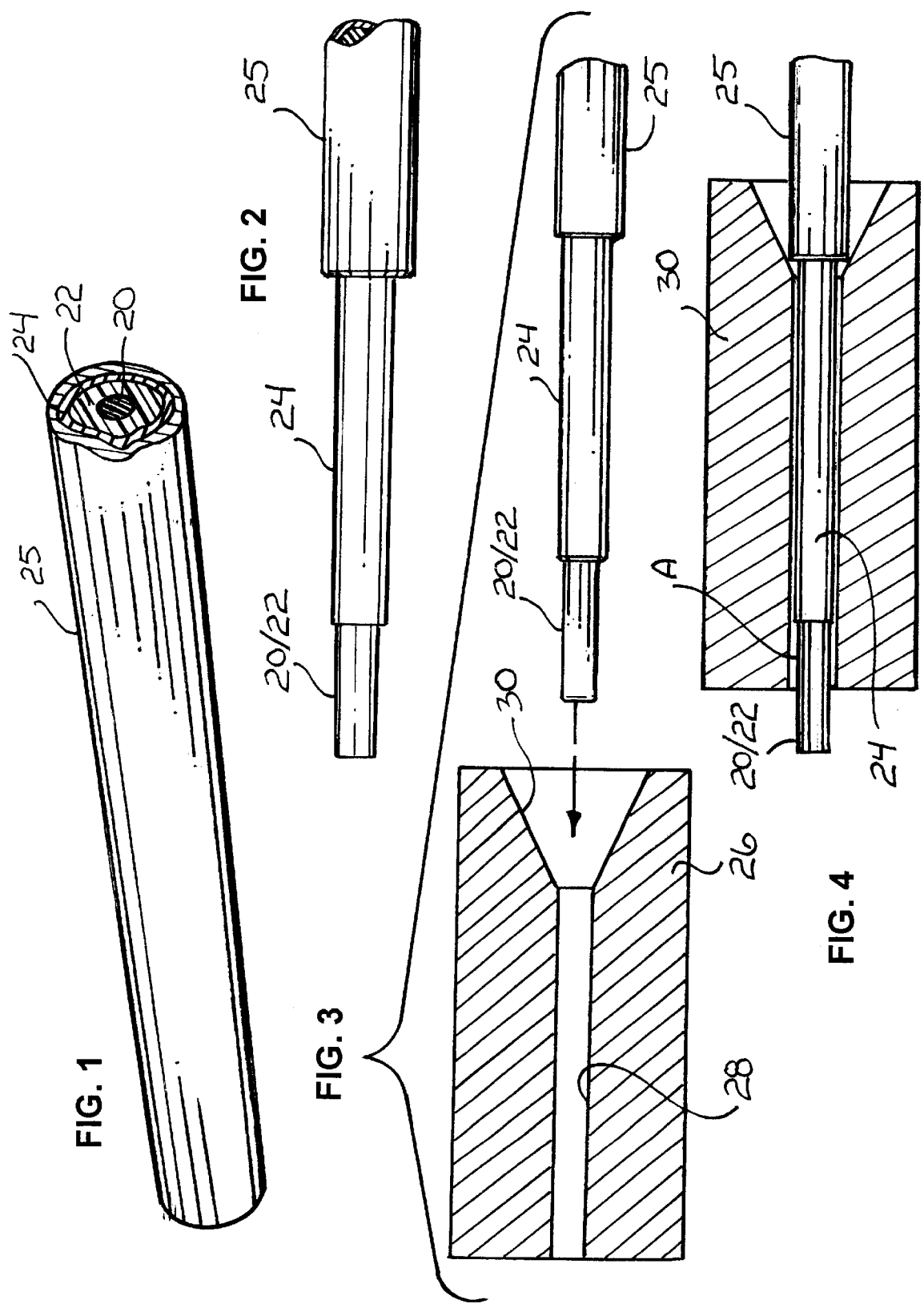

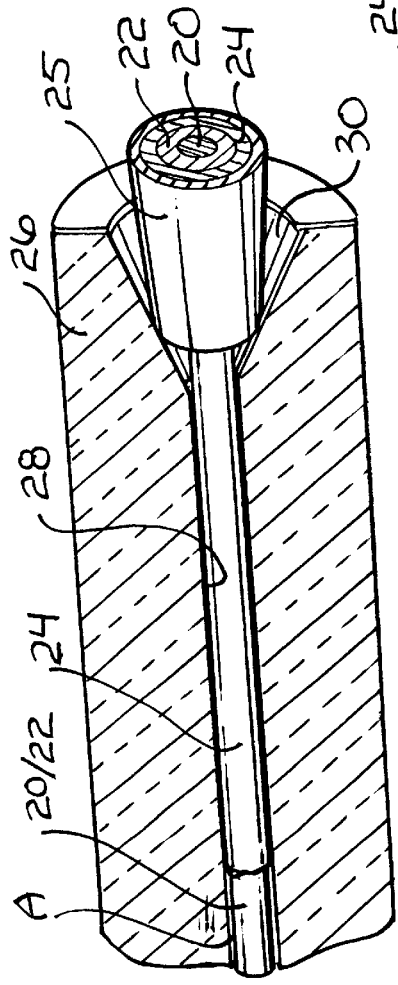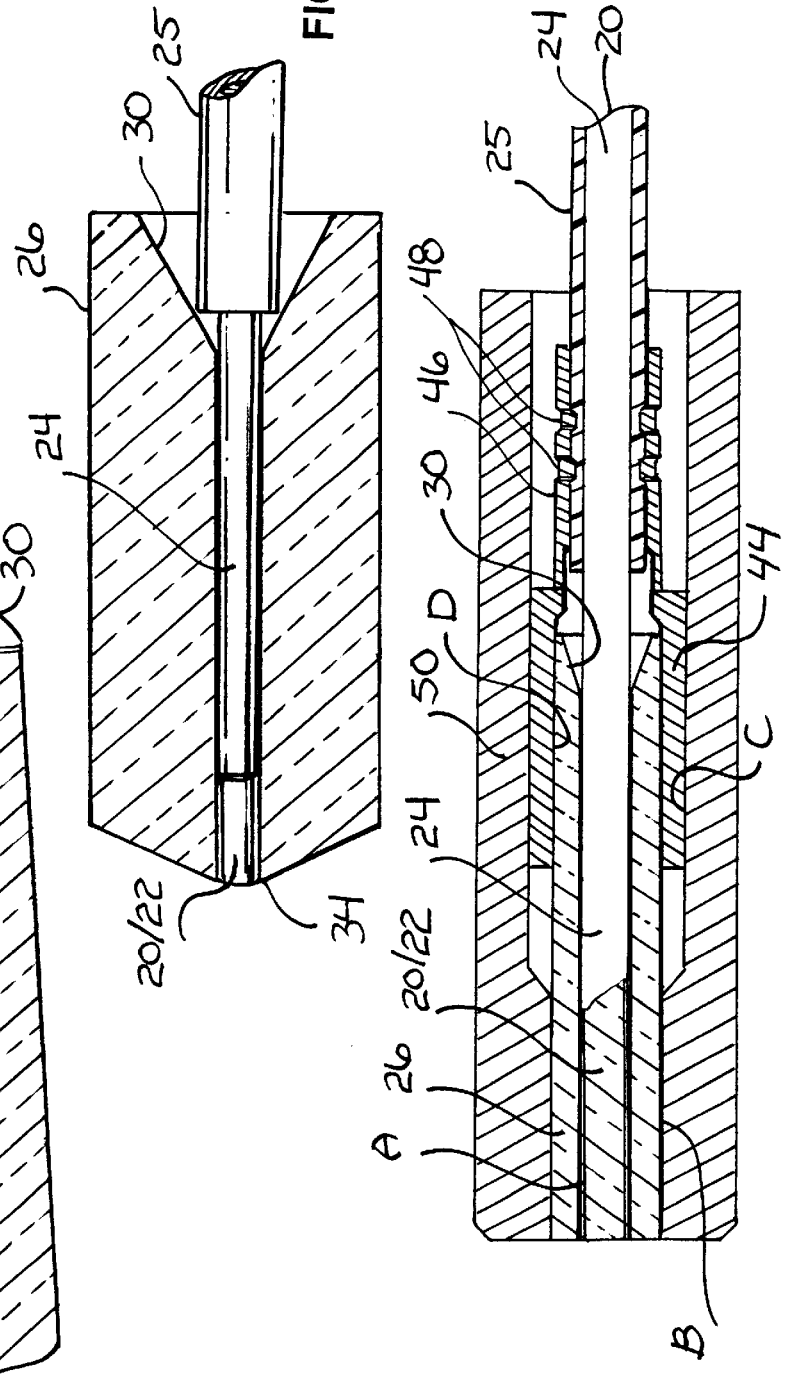

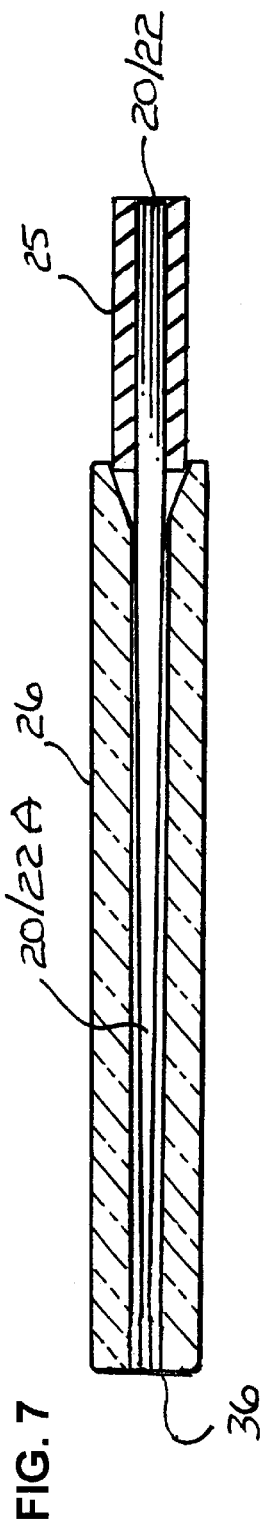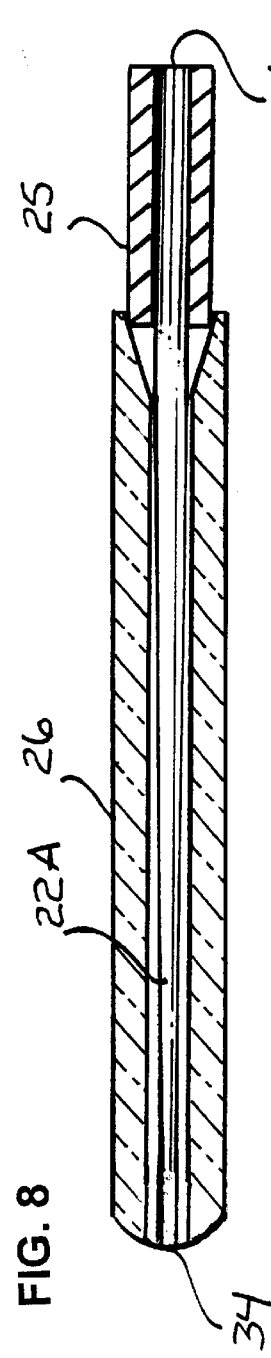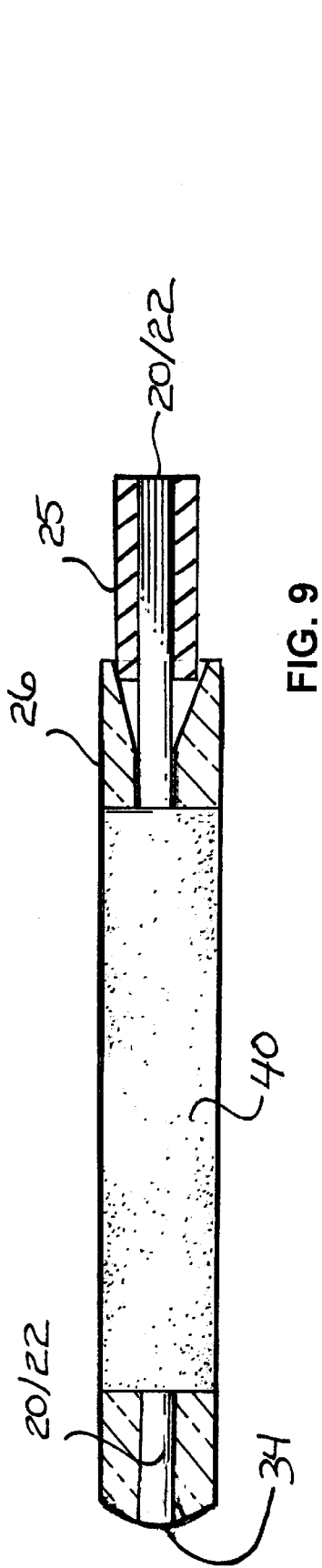
FIG. 7
FIG. 8
FIG. 9

LAUNCH FIBER TERMINATION

BACKGROUND

High energy launch fiber terminations are widely used for laser surgical applications. Some of the fibers incorporate a taper; and some are straight fiber at the launch termination. These terminations are used, by way of example, in surgical lithotripsy. Typically, in such surgical fiber applications, the fibers, whether they incorporate a taper or are straight, are stripped of the buffer (polymer coating) and are fused with a quartz ferrule at the terminus. The terminus itself may be either mechanically or laser polished, and may incorporate an integral lens.

In conjunction with surgical endoscopes, it is necessary for the OD (outside diameter) of the fiber to be small so that it can easily pass through small working channels capable of use deep in the kidney. Typically, 200 μm silica core, 220 μm silica clad, 240 μm polyimide buffer fiber has been employed. Since the cladding is a mere 10 μm thick, its use at wavelengths longer than 2 μm is questionable. A general "rule of thumb" for fiber is a cladding thickness which is five times the maximum wavelength of the light through the fiber. This rule is most important in applications where the fiber is highly stressed, that is bent at tight radii. In addition, the process of applying polyimide (solvent casting) causes the polyimide to be tight on the fiber. It basically shrinks into place in the final stages of its "cure". This shrinkage of the polyimide buffer also imparts stress to the relatively thin cladding. As a consequence, the rule mentioned above for cladding thickness is even more critical. It has been found that fibers of this type often burn up in surgery, sometimes damaging the endoscope.

The output or distal tip for endoscope fibers is prepared by cleaving or polishing (for larger core fibers). The first time, it is done in the factory or by the supplier; and then in each re-use the surgeon or nurse in the operating room cleaves the fiber. When polyimide buffer fiber is cleaved, the polyimide is stretched and a little flap of the polymer frequently remains extended beyond the end of the glass. This flap then is ignited on the first laser pulse, causing it to shrink back to the fiber face. Each subsequent pulse binds the residual carbon more tightly to the glass. The tip glows red; and the output is distorted. Finally, polyimide buffered fiber is prone to damage because of the relatively thin (typically 10 μm thick) polymer coating. As a result, the fibers commonly break long before their usefulness is exhausted.

The focal spots of lasers used in medicine tend to be somewhat sloppy, as a result of poor maintenance, design of the launch, and laser modal instability. This causes the beam often to be presented larger than that which is specified by the manufacturer.

Where fiber terminations are glued to secure them in the ferrule, deposits of the outgassing adhesive (when heated by overfill energy) tend to contaminate the laser output lens. In some cases, the fiber termination explosively fails, firing shards of glass at the lens (or in some cases, window), destroying it. While this problem of outgassing adhesive, when it is struck by stray laser energy, is not particularly significant at low energy levels, the increased energy levels which continue to be applied in laser surgery greatly exacerbate the problem. Where a metallic beam block for dissipating stray laser energy is employed, the beam block typically is adhered to the end of the quartz ferrule with adhesive, which is subject to the same possibility of failure if that adhesive is contacted with sufficient laser energy.

In an effort to avoid the outgassing problems noted above for glued fiber terminations, another approach involves removing the polymer at the fiber tip and using some mechanism to prevent the adhesive (commonly, epoxy) from wicking all of the way to the front of the ferrule. This has been accomplished by using high viscosity adhesives, preheating the ferrules so the adhesive cures at a narrow bore before it can wick, or using a temporary adhesive to take up the space where the desired adhesive is not wanted. When a temporary adhesive is used, the desired adhesive is cured; and the temporary adhesive then is removed. All of these techniques are time consuming and produce low yield. They also do not work for PCS (plastic clad silica) fiber in that the polymer coating for PCS fiber also is cladding and must remain.

Another approach to remove adhesive from the immediate area of the fiber core at the laser focus involves countersinking of the ferrule at the fiber tip; so that the adhesive for securing the fiber to the ferrule is located a pre-established distance from the fiber tip. Countersinking also requires considerable labor and produces a low yield. In addition, it is not possible to countersink very far in most standard connectors, thereby requiring custom connectors. At the same time, it is still possible to have polymer at the fiber face, depending upon the manufacturer of the fiber.

Yet another attempt for eliminating the outgassing problem is to use a specifically modified connector tip to allow a circumferential crimp directly onto the fiber coating at the tip. To accomplish this it is necessary for the fiber to have polymer up to the fiber face, since crimping directly on glass is difficult and produces very low yields. The lowered mass of the connector (metal) at the fiber tip also can result in vaporization of the metal itself, which is even worse than polymer vapor. In addition, most surgical laser interlocks do not recognize the altered outside diameter of the connector which is required for the crimp.

It is desirable to provide a robust, small diameter fiber termination which overcomes the disadvantages of the prior art noted above, which is capable of handling high power inputs, which may undergo flash autoclave sterilization, and which does not employ adhesives in any area where stray energy can contact such adhesives.

SUMMARY OF THE INVENTION

It is an object of this invention to provide an improved launch fiber termination for fiber applications.

It is another object of this invention to provide an improved launch fiber termination for laser surgical applications.

It is an additional object of this invention to provide a launch fiber termination in which the fiber is terminated in a quartz or silica ferrule.

It is a further object of this invention to provide an improved launch fiber termination in which an optical fiber is terminated in a quartz ferrule by fusing a portion of the end of the fiber to the ferrule, without an adhesive interconnection.

A more specific object of this invention includes a beam block which is crimped onto the outer polymer buffer of a fiber used in a launch fiber termination to secure the fiber within a connector and to provide strain relief without the use of adhesives between the beam block and the fiber.

In accordance with a preferred embodiment of this invention, an optical fiber, including cladding, a polymer buffer, and/or polymer jacket, is used in a launch fiber termination by inserting the fiber into a quartz ferrule. The polymer is removed from the end of the fiber which is to be fused. This end is inserted into the ferrule; and the fiber and the ferrule are fused together to form a unitary termination without using adhesive.

In a more specific embodiment of the invention, the quartz ferrule is inserted into a cylindrical beam block having an extension over the polymer-clad buffer portion of the fiber extending outside the ferrule. The extension is crimped onto the polymer buffer to provide strain relief to the assembly. The crimp beam block offers a means of securing the assembly within a connector without exposing adhesive to laser light.

BRIEF DESCRIPTION OF THE DRAWINGS

FIG. 1 is a perspective view of a typical fiber construction used in a preferred embodiment of the invention;

FIG. 2 illustrates an intermediate step in the preparation of the fiber of FIG. 1 for use in a preferred embodiment of the invention;

FIG. 3 is a partially cut away exploded view showing the manner of assembling a preferred embodiment of the invention;

FIG. 4 illustrates an intermediate step in the assembly of a preferred embodiment of the invention;

FIG. 5 is a partially cut away perspective view of a preferred embodiment of the invention;

FIG. 6 is a cross-sectional view of the assembly shown in FIG. 5;

FIGS. 7 and 8 are alternate embodiments of the invention shown in FIGS. 5 and 6;

FIG. 9 illustrates an alternative embodiment useful with the embodiments of FIGS. 5 through 8; and FIG. 10 is a cross-sectional view of a more specific embodiment of the invention incorporating the features of the embodiment shown in FIGS. 5 and 6.

DETAILED DESCRIPTION

Reference now should be made to the drawings, in which the same reference numbers are used throughout the different figures to designate the same or similar components. As shown in FIG. 1, a typical optical fiber useful in launch fiber terminations for laser surgical applications and other applications is formed of an inner silica core 20, with a silica cladding 22 around it and having a polymer coating 24 (of fluorinated acrylate) surrounded with an outside coating 25 of another polymer, such as ETFE. Such fibers are commonly used in medical applications, as described previously, and a typical dimension for the various components is for the core 20 to be 200 $\mu$m, the cladding 22 to be 240 $\mu$m, the coating 24 to be 260 $\mu$m, and the outer coating or jacket 25 to be 430 $\mu$m (200/240/260/430) fiber. Fiber of this dimension works well for surgical applications, but is on the edge of being too large an outside diameter for applications requiring small diameter fiber. Silica/silica fibers at dimensions of 365/400/430/730, 550/600/630/1030, 600/660/690/1200, and 910/1000/1040/1400 have been utilized also.

Ideally, the fiber of FIG. 1, for use in the preferred embodiment of this invention, is designed with dimensions of 150/180/200/240 $\mu$m, which is a desirable small diameter for surgical laser applications, and is quite robust (less fragile) than prior art constructions. The 150 $\mu$m core 20 is made of synthetic fused silica; and it is covered with a 180 $\mu$m fluorine doped fused silica cladding 22 (1:1.2 core: clad for long wave lengths). The silica cladding 22 then has a 200 $\mu$m fluorinated acrylate (hard clad) coating 24 on it; and the outer buffer is 240 $\mu$m ethylene tetrafluoroethylene copolymer (the outer jacket) for resistance to damage. The optical fiber also may be a silica core, silica clad, silicone coated and nylon jacketed fiber or other similar construction.

In preparing the fiber of FIG. 1 for incorporation into a termination according to a preferred embodiment of the invention, the polymer buffer layer 25 is stripped back from a length of the end of the fiber, as shown in FIG. 2. A cylindrical silica or quartz ferrule 26, having a conically tapered input or entry opening 30 in it and an elongated cylindrical bore 28 through it, is provided to receive the stripped end (the left-hand end as shown in FIG. 2) of the fiber, as indicated by the arrow in FIG. 3. The inner polymer coating 24 is removed for a length less than the length of the outer polymer jacket 25 removed previously. The fiber is inserted until it stops by interference with the outer polymer 25, as shown in FIG. 4.

The fiber 20/22 may extend beyond the left-hand end of the ferrule 26, as shown in FIG. 4; or the fiber may stop at the end of the ferrule. In any event, approximately the first or left-hand 0.2 mm to 2 mm of the fiber 20/22 are heat fused to the internal diameter 28 of the ferrule 26, as indicated at "A" in FIG. 4. This fusion may be accomplished by means of laser energy, either end-on, or from the side with rotation of the ferrule 26 and the included fiber 22. The fusion forms an integral glass end on the ferrule where the fiber terminates in it, which securely locks the fiber 20/22 to the ferrule 26, which then is used in the surgical instrument.

A laser may be used to form a lens 34 on the left-hand end of the ferrule, as observed in FIGS. 5, 6, 8 and 9; or the ferrule may be polished mechanically or by means of laser energy to form a flat end, as desired for the particular application which is to be employed with the device. While the lens 34 is shown as a convex lens, a concave or cylindrical lens could be formed as well, depending upon the application of the device. It should be noted that no adhesives are used to secure the fiber 20/22 in the much stronger or more robust ferrule 26, and that optical integrity is maintained throughout the device. As a consequence, when laser energy is applied through the silica core 20, there is no danger of energy contacting adhesive and creating outgassing or explosions which might otherwise occur if adhesives were to be used to secure the fiber 20/22 to the ferrule 26.

FIGS. 7 and 8 illustrate variations of the structure of FIG. 6 which may be employed as alternatives. The structures of these figures are basically assembled in the same manner described above in conjunction with the embodiment of FIGS. 4 through 6; but the fiber 20/22 is illustrated in FIGS. 7 and 8 as 20/22A, with down-tapering a low NA (0.22 or 0.11) large core fiber (for example, 1000 $\mu$m) to increase the effective NA at the launch. Lenses may be formed in the ends of the ferrule 26, as shown at 34 and 36 in FIGS. 8 and 7, respectively, to further expand the effective launch NA. It should be noted that the down-taper which is used in the fused ferrule of FIGS. 7 and 8 may be employed in applications wherever lower NA output is desirable, and lower NA inputs are available. Similarly, an up-taper or a smaller core fiber may be constructed in the same manner as the down-taper of FIGS. 7 and 8 (with the taper reversed) for applications where such an up-taper is desirable. The structure, however, of the embodiments of FIGS. 7 and 8 is similar to that described above in conjunction with the embodiments of FIGS. 4 through 6.

FIG. 9 illustrates a variation of the embodiments of FIG. 4 through 6, 7 and 8, which may be employed to utilize the termination in applications in addition to surgical laser instruments. In the device shown in FIG. 9, the assembly of FIGS. 5 and 6, for example, is provided with an external metallic plating 40 (gold or other suitable metal) on the exterior of the quartz ferrule 26. The utilization of metal on the ferrule 26 allows the termination to be soldered onto a circuit board or other metallic structure, e.g. diode laser "can" for utilization in a variety of applications.

Reference now should be made to FIG. 10, which is a specific representation of a laser surgical launch fiber termination incorporating the fused ferrule aspects of the embodiments described above, as well as incorporating additional features. In addition to the fiber described above, the design of FIG. 10, as well as the other designs described previously, may utilize a tapered fiber (with silica cladding) or a fiber with silica core and polymer cladding. The preferred embodiment is fatter than some of the fiber used in the prior art, but it is more robust in the use of the ETFE polymer buffer 25, one version of which is sold as TEF-ZEL®. In addition, this type of fiber is not prone to leakage at long wave lengths because it has a double thick silica cladding 21, and a secondary cladding 24 of fluorinated acrylate (FA), as described above. As a consequence, this fiber does not get damaged as easily by stray energy or mechanically as the prior art fiber.

As shown in FIG. 10, fusion of the silica fiber core 20 or 20/22 to the quartz ferrule 26 is accomplished in the manner described above in conjunction with FIGS. 4 to 6. This integral fusion of the fiber 20 or 20/22 with the quartz ferrule 26 is shown on the left-hand end as viewed in FIG. 10.

A metallic beam block 44 of a stepped cylindrical shape is slipped over the right-hand end of the quartz ferrule 26 to be in intimate contact with the ferrule 26. The beam block 44 may be attached to the exterior of the ferrule 26 at "D" by means of a suitable epoxy adhesive, though such attachment is not required. The right-hand end of the beam block 44 includes a thinner cylindrical portion 46, which extends out over the polymer layer 25, which remains on the optical fiber in this area. The beam block portion 46 is secured to the polymer by means of crimping, preferably in the form of radial crimps 48, to distort the metal material of the extension 46 and press it into the relatively soft polymer or ETFE jacket 25 as shown in FIG. 10. This provides a secure, non-adhesive locking of the fiber and the beam block, along with the quartz ferrule 26, for a mechanically rugged structure.

As noted above, a thin film of adhesive seals the ferrule 26 to crimp/beam block 44. Then, the crimp at 48 seals the buffer jacket 25 of the fiber at the crimp. This causes any mechanical pull strength subjected to the fiber to the right of the crimp, as shown in FIG. 10, to derive from the crimp to connector and crimp to fiber interfaces and not to the weld zone "A" between the quartz ferrule 26 and the fiber core 20/22.

An additional bonus has been observed when the fiber jacket 25 is crimped onto the beam block 44 at 48 prior to insertion of the assembly into the quartz ferrule 26 and prior to the fusing or welding of the exposed end (the left-hand end as shown in FIG. 10) of the fiber core 20/22, with the quartz ferrule 26. This bonus is in the improved transmission efficiency and narrower range of performance variation for terminations fabricated as shown in FIG. 10. When the crimp at 48 is installed onto the ferrule before laser fusion, the fiber core is more reproductively centered within the ferrule. This concentricity improvement is most important on smaller core fibers, which are near to or smaller than the laser focal spot size.

Another advantage of attaching the ferrule 46 to the fiber jacket 25 at the crimp positions 48 before fusing the core 20/22 with the quartz ferrule 26, as described above, is that a better angular orientation of the fiber within the ferrule takes place. The more aligned the fiber axis is with the ferrule, the better angular alignment will be with the laser launch. This aspect is important for any fiber core diameter if the fiber NA and the laser launch NA are the same or if the laser NA is higher than the fiber NA. In tapers, this aspect is critical, since the laser NA already is larger than the fiber NA. As a result, any angular misalignment results in losses to one side.

As noted above, other advantages are inherent with the design shown in FIG. 10. The crimp ferrule permits the fiber jacket 25 to be further removed from the quartz ferrule 26. This reduces the odds that stray energy will come into contact with the bulk polymer of the jacket 25. Also, for lower angle tapers (longer than the connector), the crimp section at 48 can be made longer such that the taper itself may extend beyond the quartz ferrule 26 into the metal section which self-extends beyond the connector. For the highest power applications a reflective metallic plating on the taper 30 directs spillover energy away from the fiber so that no damage can result. Finally, the amount of axial load necessary to pull the fiber from the connector (as when an attendant may trip over the fiber in the operating room) was quite low in prior art designs, on the order of about two pounds. The structure shown in FIG. 10 allows much greater axial loads without pulling the fiber from the connector.

An additional ferrule 50 then may be placed over the beam block 44 and the ferrule 26 in the manner shown. This additional ferrule is secured by adhesive at "B" to the quartz ferrule 26 and/or at "C" to the beam block 44 to hold everything in place.

For larger core fibers, it is not necessary to use a stepped beam block 44. In addition, it should be noted that the material of the beam block 44 may be of any suitable metal. The additional ferrule 50 also may be made of brass, steel, alloy, plastic, ceramic or other connector materials suitable for the operating environment in which the device is to be used. Also, in place of using adhesive at "D", a metallic plating, such as gold, may be placed on the exterior of the ferrule 26 and soldered onto the internal diameter of the beam block 44. Thus, all polymer adhesives can be eliminated from the structure. Where this is not necessary, the plating of metal on the exterior diameter of the quartz ferrule 26 is not necessary.

The structure which is shown in FIG. 10 and which has been described above also is capable of undergoing autoclave sterilization without damage. It also should be noted that in the structure which is shown in FIG. 10, all polymers are removed from any of the areas of potential direct irradiation; so that the termination should be able to survive relatively high powers (over 100 Watts) of laser energy. The mechanical fixation of the fiber, by means of the crimps 48, also provides a robust structure which is not easily damaged.

The various seals between the component parts which are effected in the embodiment shown in FIG. 10 allow the launch fiber termination to be easily sterilized by autoclave sterilization; so that the termination device may be re-used. This significantly reduces the cost of surgery utilizing such devices, since the fiber does not need to be discarded after each use. It is readily apparent that the termination is simple in concept and construction, yet it provides significantly improved operating characteristics over previous terminations, and is capable of longer life before requiring replacement.

The foregoing description of the preferred embodiment of the invention is to be considered as illustrative and not as limiting. Various changes and modifications will occur to those skilled in the art for performing substantially the same function, in substantially the same way, to achieve substantially the same result, without departing from the true scope of the invention as defined in the appended claims.

What is claimed is:

1. A launch fiber termination including in combination:

a quartz or silica ferrule having a bore therethrough with at least a portion having a first predetermined diameter;

an optical fiber having a silica core and a polymer external jacket, the jacket being stripped from a predetermined length of an end of the optical fiber to expose a portion of the silica core which is placed in the bore of the quartz ferrule, with at least the portion of the exposed silica core in the bore of the ferrule being heat fused to the portion of the bore of said first predetermined diameter to bond the ferrule and the silica core of the optical fiber together; and a beam block located adjacent the entry end of the quartz ferrule and bonded to it, with the beam block including an extension having a length sufficient to extend over the external jacket of the optical fiber when the predetermined length of exposed silica core is placed in the bore of the quartz ferrule, and wherein the extension of the beam block is secured to the external jacket of the optical fiber by mechanical crimping.

2. The launch fiber termination according to claim 1 wherein the fusion of the ferrule and the exposed portion of the inner core of the fiber is adhesive free.

3. The launch fiber termination according to claim 2 wherein the first predetermined diameter of the bore is less than the external diameter of the polymer external jacket, and is substantially equal to the external diameter of the silica core of the optical fiber.

4. The launch fiber termination according to claim 3 wherein the bore through the quartz ferrule has an entry end and an exit end for the optical fiber, with said first predetermined diameter located adjacent the exit end thereof, and the entry end thereof being conically flared outwardly.

5. The launch fiber termination according to claim 4 wherein the optical fiber is a silica core, silica clad, fluorinated acrylate coated and ETFE jacketed fiber.

6. The launch fiber termination according to claim 5 wherein the exposed portion of the silica core has the ETFE jacket and the fluorinated acrylate buffer material removed therefrom in the region fused with the portion of the bore of the quartz ferrule having the first predetermined diameter.

7. The launch fiber termination according to claim 4 wherein the optical fiber is a silica core, silica clad, silicone coated and nylon jacketed fiber.

8. The launch fiber termination according to claim 1 wherein the first predetermined diameter of the bore is less than the external diameter of the polymer external jacket, and is substantially equal to the external diameter of the silica core of the optical fiber.

9. The launch fiber termination according to claim 8 wherein the bore through the quartz ferrule has an entry end and an exit end, with said first predetermined diameter located adjacent the exit end thereof, and the entry end thereof being conically flared outwardly.

10. The launch fiber termination according to claim 1 wherein the optical fiber is a silica core, silica clad, fluorinated acrylate buffered and ETFE jacketed fiber.

11. The launch fiber termination according to claim 10 wherein the exposed portion of the silica core has the ETFE jacket and the fluorinated acrylate buffer material removed therefrom in the region fused with the portion of the bore of the quartz ferrule having the first predetermined diameter.

12. The launch fiber termination according to claim 1 wherein the optical fiber is a silica core, silica clad, silicone coated and nylon jacketed fiber.

13. The launch fiber termination according to claim 1 wherein the quartz ferrule, the optical fiber and the beam block each have a substantially cylindrical configuration.

14. The launch fiber termination according to claim 13 wherein the beam block is made of metal.

15. The launch fiber termination according to claim 14 further including an open cylindrical outer ferrule encircling and attached to the quartz ferrule and the beam block.

16. The launch fiber termination according to claim 15 wherein the outer ferrule is attached to the beam block and the quartz ferrule with an epoxy adhesive.

17. The launch fiber termination according to claim 1 wherein the fusion of the ferrule and the exposed portion of the inner core of the fiber is adhesive free.

18. The launch fiber termination according to claim 17 wherein the first predetermined diameter of the bore is less than the external diameter of the polymer external jacket, and is substantially equal to the external diameter of the silica core of the optical fiber.

19. The launch fiber termination according to claim 18 wherein the bore through the quartz ferrule has an entry end and an exit end, with said first predetermined diameter located adjacent the exit end thereof, and the entry end thereof being conically flared outwardly.

20. The launch fiber termination according to claim 19 wherein the optical fiber is a silica core, silica clad, fluorinated acrylate buffered and ETFE jacketed fiber.

* * * * *